Figure 1:
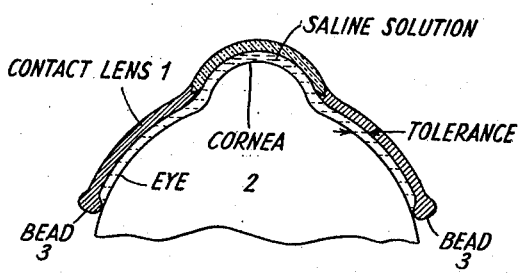

Sept. 6, 1938.  W. FEINBLOOM  2,129,305
CONTACT LENS
Filed Aug. 21, 1936   2 Sheets-Sheet 1

INVENTOR
WILLIAM FEINBLOOM
BY *Charles H. Brown*
ATTORNEY

Sept. 6, 1938.   W. FEINBLOOM   2,129,305
CONTACT LENS
Filed Aug. 21, 1936   2 Sheets-Sheet 2

INVENTOR
WILLIAM FEINBLOOM
BY *Charles H. Brown*
ATTORNEY

Patented Sept. 6, 1938

2,129,305

UNITED STATES PATENT OFFICE 2,129,305

CONTACT LENS

William Feinbloom, New York, N. Y.

Application August 21, 1936, Serial No. 97,092

2 Claims. (Cl. 88—54)

The present invention relates to contact lenses. In my copending application, Serial No. 87,577, filed June 26, 1936, there is described a method of making a contact lens from a mold of the eyeball.

In practice, the inner surface of the finished contact lens is made to differ from the surface of the mold taken from the eye in order that the finished lens should fit the eye comfortably. This difference between the two surfaces is called "tolerance" and may vary somewhat from patient to patient. The difference will depend on the various forces that operate while the eye is in motion, and the requirement that there be a fairly free flow of tears and oil under the lens.

When a contact lens made with suitable "tolerance" is placed in the eye, it will contact the eye, through the saline solution therebetween, over a certain surface area. As the lens is continuously worn over a number of hours, the eyelid tends to force the surface closer and closer into the conjunctiva of the eye. This means that the forces of friction, which exist between the two surfaces when the lens is first worn, have now been increased and produce discomfort.

The movement of the eyelids, it has also been found, generates two torques; namely, one operating around a vertical axis which tends to move the lens toward the nose, and another operating around a horizontal axis which tends to rotate the lens upward. When the eye moves about, the action of these torques is to cause the lens to slide on the eye. This sliding is of the order of a half to one millimeter and is a cause of further discomfort to the wearer.

One of the objects of the present invention is to improve the comfort of the finished contact lens.

Another object of the invention is to reduce the area of friction of the surface of the lens during sliding to substantially a minimum.

A further object is to enable the securing of greater or less "tolerance" between the inner surface of the lens and the eyeball.

A still further object is to provide a method of readily determining the "tolerance" required because of the various forces acting on the lens when placed in the eye.

Various features of the invention lie in the use of beads on the outer surface of the scleral portion of the contact lens, lenses having pinhole openings in the corneal section of the lens, filtered contact lenses for excluding one or more kinds of light rays, lenses with suitable holes in the scleral rim for reducing suction on the lens, and bifocal, trifocal and multifocal contact lenses.

Several of the foregoing objects are, in general, achieved, in accordance with the invention, through the use of a "bead" formed on the surface of the lens. By means of this bead and/or other "beads" suitably located, it is possible to have friction during sliding of the lens occur only at these "beads". This results in less of the conjunctiva of the eye being hit or bruised than if there were no "bead"; first because less of the surface area of the lens is in contact with the eye, and secondly, because friction over a rounded surface like the "bead" may be compared, in its action, to "rolling" friction rather than "sliding" friction.

Other objects, features and advantages of the invention will appear from a reading of the following detailed description which is accompanied by drawings, wherein:

Fig. 1 illustrates, in cross section, one embodiment of a contact lens in accordance with the invention as it would appear over an eyeball.

Figure 4:
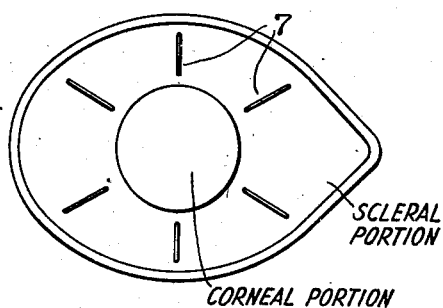
Figure 2:
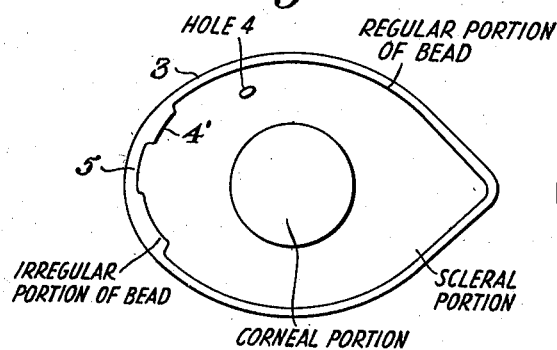
Figure 5:
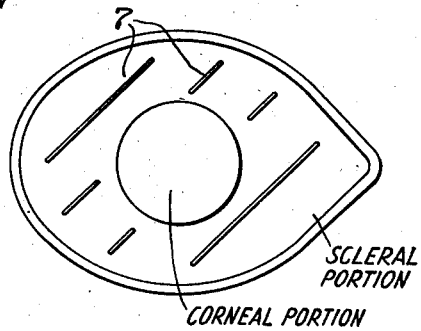
Figure 3:
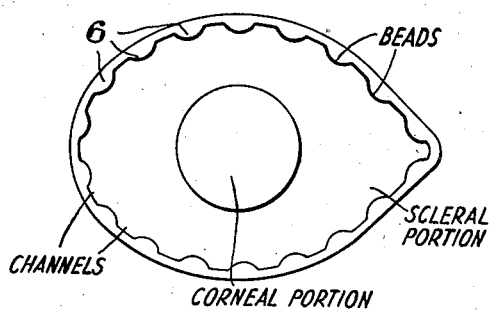
Figure 6:
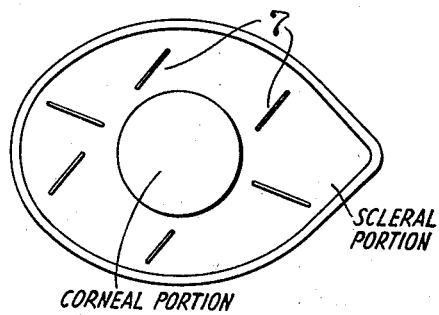
Figure 7:
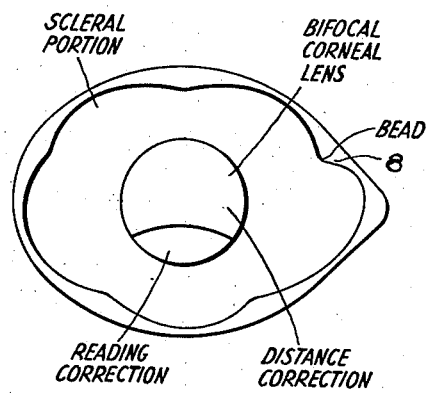
Figure 8:
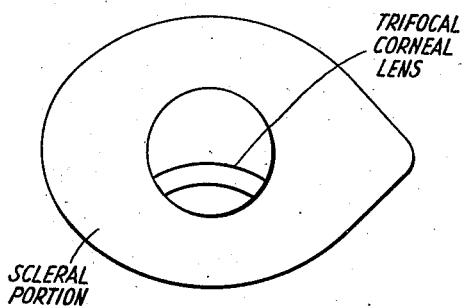
Figure 9:
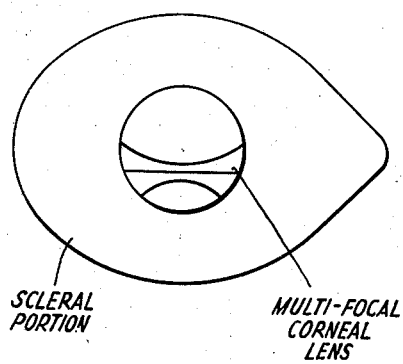

Figs. 2 to 9 illustrate other views of contact lenses made in accordance with the principles of the invention. These figures are the bottom views of the contact lenses. Figs. 2, 3, and 7 illustrate beads on the contour of the lenses, which are not of uniform shape. Figs. 4, 5, and 6 illustrate beads in the form of thin raised surfaces on the scleral portion of the lens. Figs. 7, 8, and 9 illustrate contact lenses wherein the corneal portion is a multi-focal lens.

Figure 10:
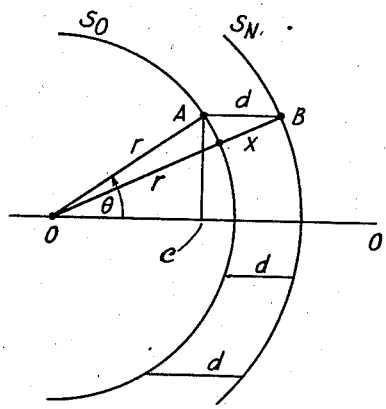
Figure 11:
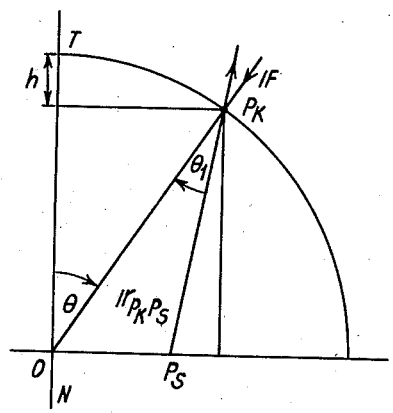

Figs. 10 and 11 are given for theoretical considerations and will be discussed later in connection with certain mathematical relations which provide a method of determining the proper "tolerance".

Referring to Fig. 1, there is shown a finished contact lens 1 resting on an eyeball 2 with the usual saline solution between the inner surface of the lens and the surface of the eye. This contact lens may, in general, consist of any suitable material, such as glass, although it is preferred that the scleral portion be made from a resin, such as a Bakelite composition, in the manner set forth in my copending application, supra. The invention, it is to be distinctly understood, is not limited to a lens whose scleral rim is made from any particular material.

Contact lens 1 is shown provided around the contour of its inner surface with a rounded ring bead 3, which enables friction between the eye and contact lens to occur during sliding only at and over the rounded surface of the bead. In this particular location of the lens, the bead may also have a rounded extension on the outer surface of the lens, as shown, to provide a sliding action of the lids over the lens. The bead may be located anywhere on the inner surface of the scleral rim of the contact lens, so as to provide for the "rolling" friction rather than the "sliding" friction and, if desired, more than one bead may be provided anywhere along the inner surface of the contact lens so that they do or do not overlap each other in their lengths, in which case each of the several beads need not be entirely continuous. These beads may also be radial, parallel, or skew in position, and may have any rolled form, either on the inner surface or outer surface of the lens to reduce friction between the lens and adjacent tissue.

An important advantage of the ring "bead" 3 is that it provides a desirable method of mechanically obtaining greater or less "tolerance" between the inner surface of the lens 1 and the eyeball 2. Thus, by varying the amount of projection of the bead 3 it is possible either to increase or decrease the "tolerance" at any particular place in the eye, or uniformly over the eye. Heretofore, it has been possible, as described in my copending application Serial No. 87,577, to obtain a desired degree of "tolerance", for example, 0.020 of an inch, by covering the mold of the eyeball with tinfoil of 0.020 of an inch thickness, and have the contact lens molded on this tinfoil. In accordance with the present invention, the same "tolerance" can be obtained by providing a ring "bead" at the contour of the lens which extends from the inner surface of the lens towards the eye to an extent of 0.020 of an inch. Of course, a combination of the above two methods of obtaining "tolerance" may be used. The choice of which of these three methods to use for obtaining "tolerance" will depend on the total amount of "tolerance" desired, and the type of eyelids or lid action present in the particular eye.

Fig. 2 illustrates a bottom view of a contact lens made in accordance with the invention and shows that the ring "bead" need not be perfectly uniform throughout its length but may be wavy or have different sizes in three dimensions. The bead, it will be evident, may also consist of several separate portions 3, 4' and 5, as in Fig. 2, so as to form channels or corrugations therebetween, in which case we have a way of reducing the suction on the lens. The saline solution between the eye and the lens, it will be found, will not flow out entirely, due to capillary attraction. Fig. 3 shows another similar arrangement, wherein a plurality of raised beads 6, 6 serve the same purpose as the beads of Figs. 1 and 2.

If desired, the suction holding the lens on the eye may also be reduced by piercing the scleral rim of the lens with one or more properly formed holes 4, of any shape, which are suitably rounded at the edges, as shown in Fig. 2.

Figs. 4, 5, 6 and 7 illustrate various forms which the beads may take, either on the inner or outer surface of the lens. In Figs. 4, 5, and 6 the beads are thin, straight, raised surfaces 7, 7. In Fig. 7 the bead takes the form of an irregular raised surface 8.

One of the important features of the invention comprises a contact lens made from a mold of the eye, and having suitable "tolerance" as determined by the torques and forces acting on the lens when in the eye, and so constructed that the lens touches the eye at a minimum number of points under all conditions, particularly during sliding. Although the invention has mentioned the use of beads, it should be understood that a contact lens made from the mold of the eye and modified so that the curvature of the entire lens or merely the curvature of the lower edge of the scleral rim is less than the curvatures of the corresponding portions of the eye, for the purpose of having the lens contact the eye only at certain points, or at the entire lower edge of the rim, is within the spirit and scope of the invention.

It has been observed that there is a best size for the bead, appreciable deviations from which will either make the lens too tight on the eye and cause pain, or make the lens too loose.

The preferred method of making a contact lens with a bead on the inner surface, although the invention is not limited thereto, is to form a plaster or stone cast or mold from an impression taken of the eye, and to provide an indentation in said mold at the location it is desired to place the bead, and from such indented mold obtain the finished contact lens, in accordance with the teachings set forth in my copending application. The depth of the indentation may correspond to or be greater than the depth of "tolerance" required, since suitable grinding or polishing of the scleral rim of the contact lens may be resorted to in order to obtain a particular size of bead.

The essential steps of this particular method involves (a) taking an impression of the eye with wax or with a hydro-colloid solution known by the trade name "Negocoll", (b) forming a plaster or stone mold (herein designated the "positive") from this impression, (c) depositing a layer of wax on the positive mold of suitable thickness, which is somewhat greater than the desired finished thickness of the contact lens, (d) tinfoiling the wax covered mold, (e) investing the tinfoiled covered mold in the lower half of a flask, (f) pouring plaster in the upper half of the flask to form the negative, (g) boiling said flask to melt the wax, thus leaving a space between the positive and negative, (h) separating the two halves of the flask, (the tinfoil, it will be found, will at this stage have adhered to the upper half,) (i) cutting a groove in the positive mold from which the wax has been melted off, for the bead, and again tinfoiling the positive, (j) placing the ground synthetic resin (such as Bakelite) in the space between the positive and negative molds, and (k) closing the flask and vulcanizing or baking the flask and contents at a suitable temperature for a desired period of time.

Where the bead is to be placed on the outer surface of the lens, a change should be made in the foregoing step (c) which will include depositing additional wax on the locations where it is desired the bead should be. Alternatively, an additional thickness of wax may be added at this particular step and the outer bead formed by grinding the finished lens.

At this time it is to be distinctly understood that the invention is not limited to the foregoing method of making a bead on the lens. For example, where it is desired that a "bead" be located on the inner surface of the lens, as shown in Fig. 1, the "bead" may be formed by bending or turning in the lowermost portion of the scleral rim during some stage in the process of manufacture, the important requirement being that the contact between eyeball and lens be substantially a minimum.

Although the matter of "tolerance" has been very generally mentioned herein, the following enables one to compute the corrections required for various types of eyes on account of the forces acting on the lens. I have found that when a contact lens is placed in the eye, it is acted upon by various forces and torques that tend to change the orientation it would otherwise possess with reference to the eye. This will result in excess pressure being exerted on some parts of the eye, and undue looseness elsewhere. To properly care for this situation it is necessary to allow certain tolerances (i. e., change curvature of inner surface of contact lens) that will cause the contact lens to be some predetermined distance (e. g., 0.6 mm.) from the eye at all points after the action of these forces and torques. These corrections will now be considered in detail.

I. Anterior-posterior correction

When both the eye and lids are stationary, three following forces keep the contact lens in equilibrium:
 a. Force due to atmospheric pressure.
 b. Force due to lid pressure.
 c. Force due to pressure of water between eye and contact lens.

However, small changes in lid pressure cause small translational motion of the contact lens along an axis perpendicular to the cornea. It is then desirable that those portions of the contact lens touching the scleral portion of eye (due to small inward translation) exert an equal pressure throughout this region. This problem may be stated geometrically as follows:

Given a surface (scleral portion of eye): Required to find another surface such that if translated parallel to itself along an axis (corneal axis) it will touch such surface at all points at the same time.

Referring to Fig. 10, it will be noted that the answer is another surface ($S_N$) identical to the first ($S_O$), and merely translated a certain distance, $d$. Practically the second surface $S_N$ must be obtained from the first by adding tinfoil to a plaster cast of same, and building it up to the new surface. Since burnished tinfoil lies on a surface so that its maximum thickness at any point lies normal to surface, it is obviously necessary to make a computation of one thickness ($X$) of tinfoil as a function of the radius of curvature ($r$) at the point, and the height ($h$) of the point from the axis of translation (O—O): The following calculation is perfectly general and may be applied to any surface where the radii of curvature and the $h$'s are generally known. However, for simplification, it will be assumed the surfaces are spherical.

Applying the cosine law to triangle OAB

1. $(r+x)^2 = r^2 + d^2 + 2rd \cos \theta$
2. $OC = r \cos \theta$
   $= \sqrt{r^2 - h^2}$
3. $(r+x)^2 = r^2 + d^2 + 2d\sqrt{r^2 - h^2}$ Hence X is known as a function of the parameters $r$, $h$, and $d$.

As a simple illustration let $$r = 12 \text{ mm.}$$
$$d = 0.6 \text{ mm.}$$

then the following schedule may be prepared from 3.

| r mm. | d mm. | h mm. | x mm. |
|---|---|---|---|
| 12 | 0.6 | 6 | 0.52 |
|  |  | 8 | 0.46 |
|  |  | 10 | 0.35 |

The rightmost column indicates the actual thickness of tinfoil to be put on the plaster model of $S_O$ on the various zones so as to produce $S_N$.

It was found useful to employ auxiliary formulae to save time in performing these calculations. One was to determine small changes in X due to changes in $d$ alone.

From 3;  4. $2(r+x)\frac{\delta x}{\delta d} = 2\sqrt{r^2 - h^2} + 2d$

5. $\frac{\delta x}{\delta d} = \frac{d + \sqrt{r^2 - h^2}}{r + x}$

Also  6. $(r+x)\left(\frac{\delta r}{\delta x} + 1\right) = r\frac{\delta r}{\delta x} + \frac{rd\frac{\delta r}{\delta x}}{\sqrt{r^2 - h^2}}$ 7. $\frac{\delta r}{\delta x} = \frac{r + x}{\frac{rd}{\sqrt{r^2 - h^2}} - x}$ This formula is used as a computing gage to determine the thickness of the second coating of tinfoil for the positive mold, to obtain the dimensional requirements for the inner surface of the contact lens in making a mold in accordance with the preferred method as outlined above (step $i$) and in my copending application, supra.

II. Vertical torque correction (horizontal forces about vertical axis)

In obtaining the value of the correction for vertical torque, let us consider a thin portion or shell of the contact lens between two parallel horizontal planes which pass nearly through the center of the cornea, particularly in connection with Fig. 11.

In considering the action of the lids on the thin lens shell as they close, it will be assumed that there exist normal forces acting on the shell (due to lid) that are a minimum at the temple (T) and a maximum at the nasal (N) portion.

It is desired to compute the torque $$\frac{\widehat{P_S}}{|h}$$

that this gradient distribution generates about the center of gravity ($P_S$) of the thin shell (assumed spherical).

The torque about $P_S$ may be defined as $$\frac{\widehat{P_S}}{|h} = \Sigma |r_{P_K P_S} \times |F_{P_K S}$$

where $|rP_KP_S$ is the radius vector from the center of gravity to the portion of thin shell (treated as a set of particles) $P_K$, and $$|F_{P_kS}$$

is the force exerted on $P_K$ by the system S (eyelid).

For computational simplicity it will be assumed that $|F$ increases in magnitude linearly with the distance $h$.

Then:

$$|F_{P_KP_S} = K_1 r(1 - \cos\theta) r\delta\theta,$$

$K_1$ being a proportionality constant.

The summation may be replaced by an integration, and $$\frac{\widehat{P_s}}{|h} = \int K_1 r^2 (1 - \cos\theta) \delta\theta_{r_1} \sin\theta_1; \quad r_1 = |r_{P_KP_S}$$

In triangle $OP_sP_K$ $$\frac{r_1}{OP_s} = \frac{\cos\theta}{\sin\theta_1}; \quad OP_s = \frac{2}{\pi} r; \quad r_1 \sin\theta_1 = \frac{2}{\pi} r \cos\theta$$

$$\frac{\widehat{P_s}}{|h} = \int_0^{\pi} K_1 r^2 (1 - \cos\theta) \delta\theta \frac{2}{\pi} r \cos\theta =$$

$$\int_0^{\pi} \frac{2}{\pi} K_1 r^3 (\cos\theta - \cos^2\theta) \delta\theta$$

$$\frac{\widehat{P_s}}{|h} = K_1 r^3$$

It will now be assumed that this torque causes the thin shell to undergo a small rotation $\Delta\theta$ about the center of gravity. The energy for this rotation comes essentially from the motion of lids when they close. The lids will be assumed to exert a frictional force on the shell, and to move through a distance of 1 mm. approximately. The work done by the lids will be taken as the product of this frictional force and this displacement of 1 mm. This frictional force may be compared with the force exerted by the water between the lens and the eye. The latter is represented by $$\frac{\pi}{2} r^2 dg$$

(a calculation similar to the one presented above.) Assume:

$$\text{Frictional force} = K_2 \frac{\pi}{2} r^2 (dg)$$

(dg=weight 1 c.c. of water).

Frictional force $$\times 1 \text{ mm.} = K_2 \frac{\pi}{2} r^2 dg \times 1 \text{ mm.} =$$

work done by lid.

This work may be equated to the product of the torque by $\Delta\theta$. Then:

$$\frac{\widehat{P_s}}{|h} \Delta\theta = K_2 \frac{\pi}{2} r^2 (dg) \times 1 \text{ mm.}$$

$$\Delta\theta = \frac{K_2 \pi 1}{K_1 2 r} (dg) \times 1 \text{ mm. [radeans]}$$

This formula is used, together with other formulae set forth hereinafter, in determining the net tinfoiling and relief corrections which are applied in step (i), mentioned above.

The values for $K_1$, $K_2$ were estimated from practical experience. A typical calculation may be made with $K_2=2$, $K_1=7.5$ (dg) yielding following schedule.

| $r$ mm. | Radius arm (h) mm. | X mm. | Net temple corr. mm. | Net nasal corr. mm. |
|---|---|---|---|---|
| 12.0 | 6 | 0.20 | 0.32 | 0.72 |
|  | 8 | .26 | 0.20 | 0.72 |
|  | 10 | .32 | 0.03 | 0.67 |

It is now assumed that this rotation, which will cause the lens to dig in at the nasal portion and be loose at the temple portion, may be neutralized by positively tinfoiling the amount indicated in the rightmost column in nasal portion, and negatively tinfoiling the same quantities on the temple side. This amounts to addition and subtraction of this correction to the anterior-posterior correction to obtain the final tolerance desired in this shell. In other words, where the lens would ordinarily dig in at the nasal portion and stand away at the temple portion, it is necessary to effectively remove enough material from the inner surface of the nasal portion of the lens and add material to the inner surface of the temple portion of the lens to fill in the gap which previously existed. This removal of material may be termed "positive tolerance" and is, in practice, actually obtained by suitable tinfoiling in the foregoing step (i), whereas the addition of the material in order to fill in the gap may be termed "negative tolerance" and is, in practice, obtained in the same step (i) of the process by scooping out or relieving the surface of the plaster positive cast or mold before the tinfoiling.

*III. Horizontal torque correction (vertical forces about horizontal axis)*

Exactly the same sort of calculation may be made for other meridians; such a one refers to the rotation of the lens about a horizontal axis. The formulae are identical with those for the vertical torque except for the constants $K_1$ and $K_2$. After suitable values for $K_1$, $K_2$ are selected, the tolerances may be calculated. As an illustration, a typical set of values would be $K_1=2$, $K_2=2$.

The vertical and horizontal torque corrections are functionally of the same nature as the anterior-posterior correction, and, with the latter, are used to determine the net thickness of the second coating of the tinfoil to be placed on the positive mold.

In the entire discussion above, it has been assumed that spherical surfaces properly represent the eye. This is entirely different from what has been discovered by actual measurements. A method for obtaining the curvature distribution of the eyeball (scleral portion) was employed to obtain the proper radius in any particular meridian. The method was to employ a magnified, opaque projection of a plaster cast (of the living eye) in any desired meridian.

In computing the horizontal and vertical torques, the value of $K_2$ which has given best results has been 2.0, while for both torques the value of $K_1$ may vary substantially between 3.5 and 7.5, the exact value of which may be determined by learning the proper "tolerance" of the lens in one meridian, as by examination of the loose portion of a lens perfectly adapted to the mold of the eye after being placed in the eye and acted upon by the above mentioned forces. The extent of the looseness is precisely the "negative tolerance" required in that meridian. Since the anterior-posterior correction in that meridian is known for all eyes, this correction may be subtracted from the above negative tolerance and the remaining tolerance may be substituted in the formulae involving $K_1$ to determine the value of this constant. This value of $K_1$ may then be used to determine the "tolerance" in all other (eight are usually sufficient) meridians of the same eye. Inasmuch as there are two torques involved and the value of $K_1$ will be different for each torque, then the looseness must be observed in the temple portion of the eye for the value $K_1$ for the vertical torque (horizontal forces) and in the inferior portion of the eye for the value of $K_1$ for the horizontal torque (vertical force).

The contact lens, preferably made from a mold of the eye in accordance with the teachings outlined herein, and preferably provided with one or more "beads", finds convenient application to certain cases where it is necessary that the glass corneal section contain a filter, especially in cases of marked photophobia (intolerance to light), cases of albinism, or where the contact lens is to be used under conditions of excessive light, such as mountain climbing, seashore, water and snow glare.

The use of colored filters in the glass portion may also be used to change the color of the iris in the eye, so that by a suitable selection, a blue-eyed person may be made to appear brown-eyed.

Another variation of this filter in the corneal glass section may take the form of a pinhole opening. The entire corneal glass can be made opaque, except for a small clear portion of the size of 1 or more millimeters. This would be useful in cases where no pigment existed in the iris at all, or some anomaly existed in the lens of the eye, such as partial cataracts. Such a lens, having a pinhole opening in the corneal section, could also be used for experimental purposes where it is important to have a constant size pupil. Similarly, by having more than one pinhole opening in the corneal section of a contact lens, it would be possible to conduct certain experiments in physiological optics.

There are certain cases where the sclera of the eye lacks sufficient pigment, resulting in light entering the eye through the sclera. This is true in cases of albinism. It is proposed to tint the transparent scleral portion of the contact lens with a suitable coloring material, or to make such scleral portion of an opaque material.

Another use for the contact lens, as designed above, is in cases of deformed eyes, due to anomalies at birth or subsequently injury. In such cases, as well as in cases of crossed eyes, the corneas are turned in, out, up or down. It is possible, by properly displacing the corneal glass section of the contact lens, to make the eye appear as though it were perfect.

Other applications of the invention lie in the use of contact lenses whose corneal sections are made with two or more different refractive powers. In many cases it is required to have a bifocal correction. This bifocal or two-vision glass can be made in this contact lens by using for the corneal lens portion a lens, the upper part of which is fitted for the patient's distance vision, the lower part of which is fitted for the patient's reading vision. Such a lens, preferably made from a mold of the eye and provided with one or more "beads", is shown in Fig. 7.

In the same way, it is possible to make the corneal section of three or more different refractive sections. Such lenses are termed trifocal or multifocal lenses. Examples of these are shown in Figs. 8 and 9, and may include one or more "beads" on the surfaces of the scleral rim in the manner shown in any of the Figures 1 to 7.

By the term "bead", as used in the foregoing description and appended claims, it is to be distinctly understood is meant any projection or raised portion of any shape whatsoever which extends from an absolutely uniform surface of the lens. Thus where discontinuous beads are used, the beads may comprise triangular projections whose apices are rounded, which projections protrude from an otherwise uniform inner or outer surface.

What is claimed is:

1. A process of producing a contact lens which includes the steps of obtaining an impression of the eye, forming a mold from said impression, providing an indentation in said mold for the purpose of forming a bead on the inner surface of the scleral portion of the lens, depositing a suitable layer of wax and an overall metallic layer on said mold, investing said covered mold in a flask, effecting evacuation of the wax to produce a metal walled negative whose internal dimensions generally conform with the outer surface of the scleral portion of said lens, filling the metal walled negative with suitable material to form the scleral portion of said lens, forming from the original mold a metallic lined model whose external dimensions generally conform to the dimensional requirements of the inner surface of said lens, and hardening said suitable material to conform with the internal dimensions of said negative and the external dimensions of said metallic lined original mold, to form the lens.

2. A contact lens comprising a glass corneal lens portion and a scleral rim portion of moldable synthetic resin shaped to rest on the sclera of an eye to hold the corneal lens portion in position before the cornea, said scleral rim portion having its contacting surface formed with projections and depressions so that only the projections contact the sclera and the area of contact is thus reduced.

WILLIAM FEINBLOOM.